(12) United States Patent
Powers

(10) Patent No.: US 6,233,703 B1
(45) Date of Patent: *May 15, 2001

(54) AUTOMATIC GENERATION OF EVALUATION ORDER FOR A FUNCTION BLOCK DIAGRAM AND DETECTION OF ANY ASSOCIATED ERRORS

(75) Inventor: Leslie V. Powers, Irvine, CA (US)

(73) Assignee: Triconex Corporation, Irvine, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/002,184

(22) Filed: Dec. 31, 1997

(51) Int. Cl.[7] .................................................. G05B 19/42
(52) U.S. Cl. ................................................ 714/48; 700/1
(58) Field of Search ........................... 714/48; 700/1–306

(56) References Cited

U.S. PATENT DOCUMENTS

| | | |
|---|---|---|
| 5,168,441 | 12/1992 | Onarheim et al. . |
| 5,243,511 | 9/1993 | Zifferer et al. . |
| 5,297,257 | 3/1994 | Struger et al. . |
| 5,349,518 | 9/1994 | Zifferer . |
| 5,371,895 | 12/1994 | Bristol . |
| 5,444,843 | 8/1995 | Nilsson et al. . |
| 5,485,620 * | 1/1996 | Sadre et al. ............................ 395/700 |
| 5,526,268 | 6/1996 | Tkacs et al. . |
| 5,576,946 | 11/1996 | Bender et al. . |
| 5,841,654 * | 11/1998 | Verissimo et al. .................... 364/188 |
| 5,867,382 * | 2/1999 | McLaughlin ........................... 364/146 |
| 5,909,368 * | 6/1999 | Nixon et al. .......................... 364/131 |
| 5,940,296 * | 8/1999 | Meyer ................................... 364/188 |

OTHER PUBLICATIONS logiCAD/32, www.kirchnersoft.com, pp. 1–22.
ISaGRAF, www.isagraf.com, pp. 1–8.

* cited by examiner

*Primary Examiner*—David Wiley
(74) *Attorney, Agent, or Firm*—Fulbright & Jaworski L.L.P.

(57) ABSTRACT

The programming of programmable controllers and other sequential computing devices is facilitated by automatically generating an order for evaluating function blocks in a function block diagram and by automatically detecting any errors in a function block diagram which would adversely affect the generation of a unique evaluation order, such as illegal cycles, disconnected subnetworks, and/or wired-OR connections. The nodes affected by the noted errors are graphically displayed to the user, who then may use a graphical interface to edit the network until all the noted errors have been corrected. A recursive procedure analogous to a topological sort may be used to automatically generate a unique evaluation order. The blocks upstream from each "maximal" output are visited recursively from the input of one block to the output of a preceding block until a "minimal" node is reached which either is not preceded by other blocks or is preceded only by blocks which have already been visited, whereupon the current block is assigned the next available sequence number and the same procedure is used to process any nodes that are upstream from the next downstream output.

9 Claims, 4 Drawing Sheets

AUTOMATIC GENERATION OF EVALUATION ORDER FOR A FUNCTION BLOCK DIAGRAM AND DETECTION OF ANY ASSOCIATED ERRORS

TECHNICAL FIELD

The present invention relates generally to programmable controllers and other computing devices, and more generally to the apparatus and associated method for facilitating the programming of such a device by automatically generating an order for evaluating functions and function blocks in a function block diagram and for automatically detecting errors associated with the evaluation order.

BACKGROUND

Function block diagrams for use with programmable controllers are defined in IEC standard 1131-3, which is hereby incorporated by reference. Other programming languages covered by that standard include Ladder Diagrams (based on diagrammatic conventions typically used to represent relay-based systems) and Structured Text (based on text conventions typically used to represent sequential operations in a digital computer).

A function block diagram is a normalized two dimension representation of an executable program such as may be implemented in a digital process control system or other digital computer, and typically consists of one or more disconnected networks, each comprising a number of connected inputs, outputs, function blocks and functions.

A function block exists as a particular instance associated with one or more specified variables which persist from one evaluation of that instance to the next, while a function has no such persistent variables. In turn, a higher level function block may include not only inputs and outputs, but also one or more functions and lower level function blocks, and a higher level function may contain one or more lower level functions. Accordingly, a function block diagram typically represents an ongoing process that involves multiple executions of related processes and outputs that vary in response to not only changes in external inputs, but also the passage of time.

One specific application of an IEC 1131-3 function block diagram or other 1131-3 programming language is to provide an application programmer with a convenient means to define a program for operating the three redundant programmable controller modules of a critical control and safety system such as the Tricon™ Version 9 single chassis safety control system in which the same application program is developed and downloaded to three isolated parallel digital processors. Since digital control processors operate in a sequential fashion and all three processors must produce the same output at any given time, a sequential evaluation order must be assigned to the individual blocks and functions such that each iteration of the program produces a predictable set of output values. In particular, a valid IEC 1131-3 Function Block Diagram cannot include any closed loops (feedback) within a single evaluation cycle, although any persistent variable evaluated during a particular evaluation cycle can be used as an input variable during a subsequent evaluation cycle.

A topological sort is a known mathematical process for mapping a partially ordered set (which may be represented by a multi-dimensional graph of nodes connected by directional paths) onto a completely ordered (i.e., one-dimensional) set of relationships. These and other related techniques are discussed at length in *Discrete Mathematics in Computer Science* by Donald F. Stanat and David F. McAllister, which is hereby incorporated by reference.

SUMMARY

In accordance with an overall objective of the present invention, the programming of programmable controllers and other sequential computing devices is facilitated by automatically generating an order for evaluating function blocks in a function block diagram A more specific objective is to automatically detect any errors in a function block diagram which would adversely affect the generation of a unique evaluation order.

Another more specific objective is to provide a graphical interface to facilitate the identification and correction of an error in the form of a closed loop.

In a presently preferred embodiment, a graphical user interface is used to define a number of nodes including program inputs, program outputs, function blocks, and logic functions, and to connect those nodes to form a function block diagram network. The network is then checked for the presence of various errors, such as illegal cycles, disconnected subnetworks, and/or wired-OR connections. Preferably, the nodes affected by the noted errors are graphically displayed to the user, who then may use the graphical interface to edit the network until all the noted errors have been corrected. Once any noted errors have been corrected and a fixed sequence has been assigned to all the external outputs (or the external inputs), a recursive procedure analogous to a topological sort may be used to automatically generate a unique evaluation order based only on the assigned fixed sequence and on the defined connections. Assuming that the topological sort starts at the network outputs, those outputs are automatically assigned a definite sequence, which may be based upon the physical location on the diagram of their associated function blocks and the order in which they are connected to the terminals in those function blocks. The blocks upstream from each output are then visited recursively from the input of one block to the output of a preceding block until a "minimal" node is reached which either is not preceded by other blocks or is preceded only by blocks which have already been visited and assigned sequence numbers, whereupon the current block is assigned the next available sequence number and the same procedure is used to process any nodes that are upstream from the next downstream output. The process is repeated until all network outputs have been processed or an error condition has been detected.

Those skilled in computational science will recognize that the constraint that there are no closed cycles guarantees that the associated digraph and all sub-digraphs of the original digraph will always have at least one "minimal" node and at least one "maximal" node, and will also recognize that the ordering process could have equally well commenced at the first input of a fixed sequence of inputs. Similarly, the constraint that all the nodes (blocks) in a given network are connected guarantees that the ordering process will not terminate until all nodes have been assigned an evaluation sequence number.

Other constraints, such as the prohibition on wired-OR connections and the requirement for a fixed sequencing of external inputs (or outputs), are preferably included not to guarantee that the network can be evaluated, but rather to ensure that the resultant evaluation order is predictable a priori. Otherwise, exactly the same diagram could produce different instruction sequences producing different intermediate results, thereby introducing an element of chance and sacrificing the reliability and serviceability possible only when every step of every process is both redundant and predictable.

In accordance with another aspect of the invention, a process somewhat analogous to a topological sort is used to recursively identify both minimal and maximal nodes until only a core having no minimal or maximal elements is left. By following successive directed paths from one node of that core until a previously visited node is reached, an illegal closed loop may be identified which includes not only that previously visited node, but also all the other nodes visited between the two successive visits to that node.

Any disconnected network is preferably also identified before the evaluation order is assigned.

DRAWINGS

DETAILED DESCRIPTION

Figure 1:
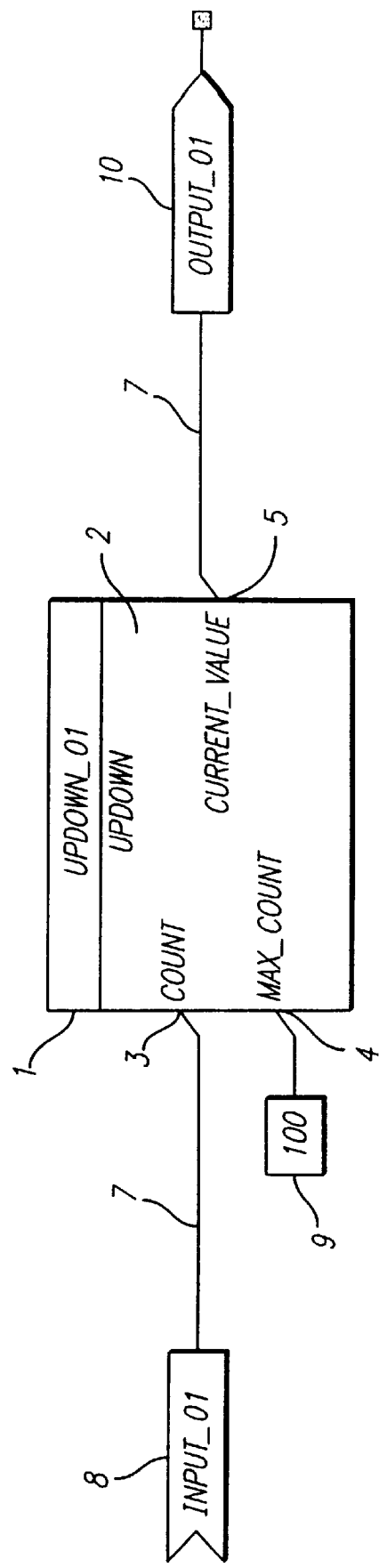
FIG. 1 is a function block diagram of a program comprising a single function block.
Figure 2:
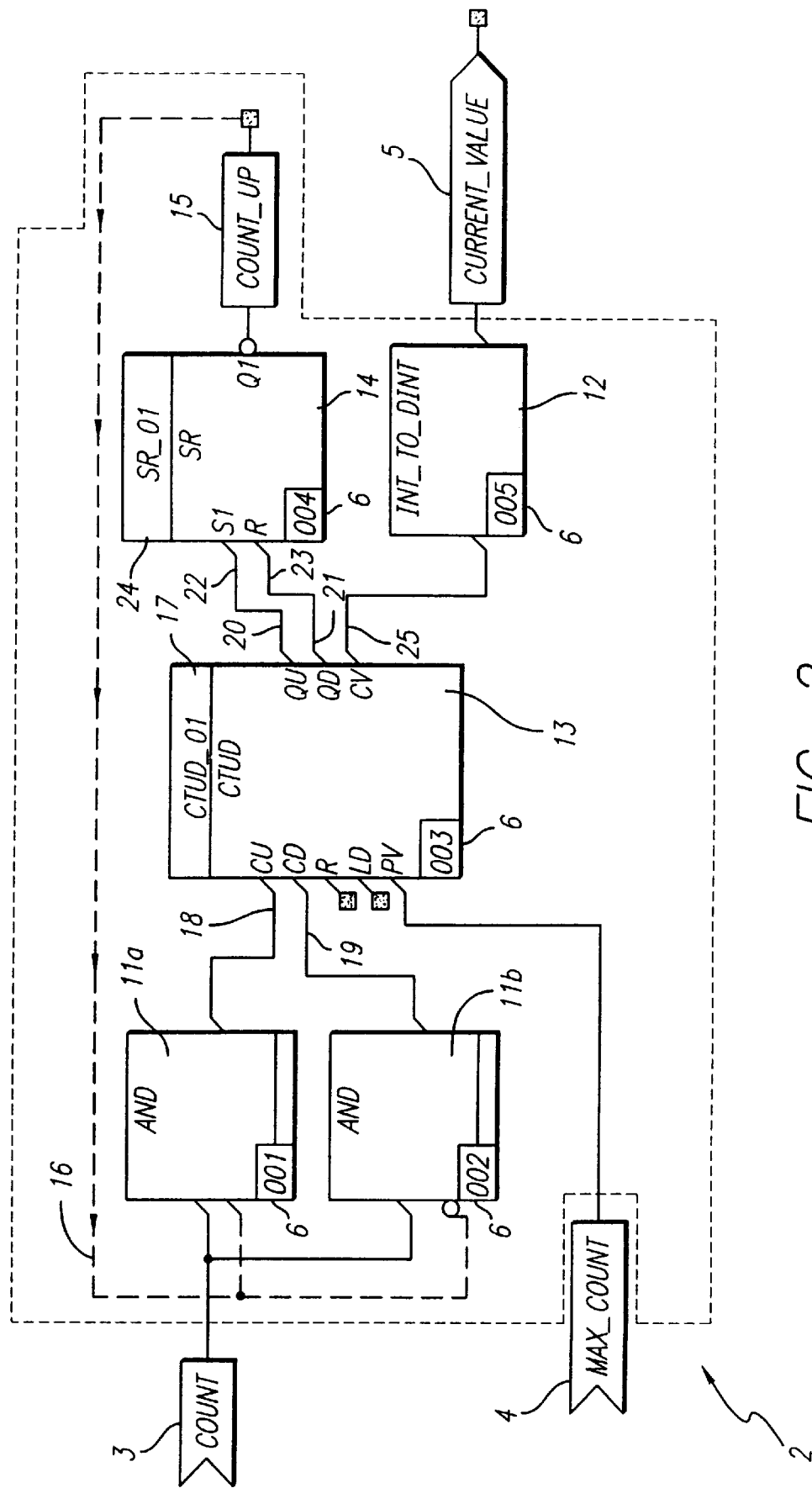
FIG. 2 is a function block diagram that implements the single function block of FIG. 1, showing how a single function block may comprise a plurality of elements including functions and function blocks.

FIG. 1 shows a function block diagram of a program comprising a particular instance "UPDOWN_01" (as indicated in upper label portion 1) of a "UPDOWN" function block 2 (defined in FIG. 2). In particular, note that the function block 2 includes two inputs on its left: "COUNT" input 3 and "MAX_COUNT" input 4, as well as a single output on its right: "CURRENT_VALUE output 5. At the lower left corner an evaluation sequence number 6 is displayed, namely "001". Connected to the respective inputs 3, 4 and output 5 of block 2 by means of wires 7 are external input variable "INPUT_01" 8, input constant "100" 9 and output variable "OUTPUT_01" 10. "UPDOWN" function block 2 is a particularly simple user defined function block which merely outputs an integer at output 5 which is incremented for a predetermined number 9 of evaluation cycles (100 in the particular instance shown in the Figure) and which is then decremented for the same number 9 of evaluation cycles back to zero, with the entire process being repeated for so long as a Boolean "1" appears at input 3. Since the entire program of FIG. 1 comprises only one function block 2 without any external connections between inputs 3, 4 and output 5, there is no possibility of any illegal cycle connections or disconnected other elements, and only one possible evaluation order "001" as displayed in sequence indicated 6.

However, as shown in FIG. 2, even the simple single function block 2 of FIG. 1 may be built up of a number of lower level functions such as "AND" function 11 and "INT_TO_DINT" function 12 (which implement conventional logical and format conversion functions and which are preferably accessed from an existing function library) as well as previously defined (and preferably also part of an existing library) basic function blocks such as "CTUD" function block 13 (a simple up-down counter) and "SR" function block 14 (a simple set/reset latch). Note that the external input variables COUNT 3 and MAX_COUNT 4, and external output variable CURRENT_VALUE 5 of FIG. 2 correspond to similarly labeled input and output terminals of FIG. 1, and that the UPDOWN function block 2 also contains a local variable COUNT_UP 15 and a feedback wire 16, However, unlike the normal wires 7, feedback wire 16 is shown in a distinctive fashion (for example, in heavy dashed line with backward facing arrows) to indicate that it is a feedback wire. In particular, in the case of a normal wire 7, the signal flow is from an output terminal (which in accordance with IEC 1131 is always located on the right) of a previously evaluated block to an input terminal on the left of a subsequently evaluated block; while for a feedback wire 16, the signal flow is from an output terminal on the right of a subsequently evaluated block to an input terminal of a previously evaluated block.

As indicated by evaluation sequence indicators 6, the various elements of function block 2 are evaluated in a determined sequence in which all input variables required for evaluating a particular function 11,12 or function block 13,14 are either external input variables, or are internal output variables from other elements which have already been evaluated in the same evaluation cycle, or are internal feedback output variables from a prior evaluation cycle. Thus, since CTUD_01 function block 17 has input terminal CU 18 connected from AND function 11a and input terminal CD 19 connected from AND function 11b, both AND functions 11a, 11b must be evaluated before function block 17 can be evaluated. Similarly, since output terminals QD 20 and QU 21 on the right side of CTUD_01 function block 17 are connected to the Set 22 and Reset 23 input terminals of bistable function block SR_01 24 and output terminal CV 25 of CTUD_01 function block 17 are connected to the unlabeled input terminal on the left side of INT_TO_DINT conversion function 12, block 17 must be evaluated before either function block 24 or function 12.

Thus a permissible evaluation order is:

| | |
|---|---|
| 001 | AND function 11a |
| 002 | AND function 11b |
| 003 | CTUD_01 function block 17 |
| 004 | SR_01 function block 24 |
| 005 | INT_TO_DINT function 12 |

Other evaluation orders are also possible, for example:

| | | | |
|---|---|---|---|
| AND function 11a | 001 | 002 | 002 |
| AND function 11b | 002 | 001 | 001 |
| CTUD_01 function block 17 | 003 | 003 | 003 |
| SR_01 function block 24 | 005 | 004 | 005 |
| INT_TO_DINT function 12 | 004 | 005 | 004 |

Figure 3:
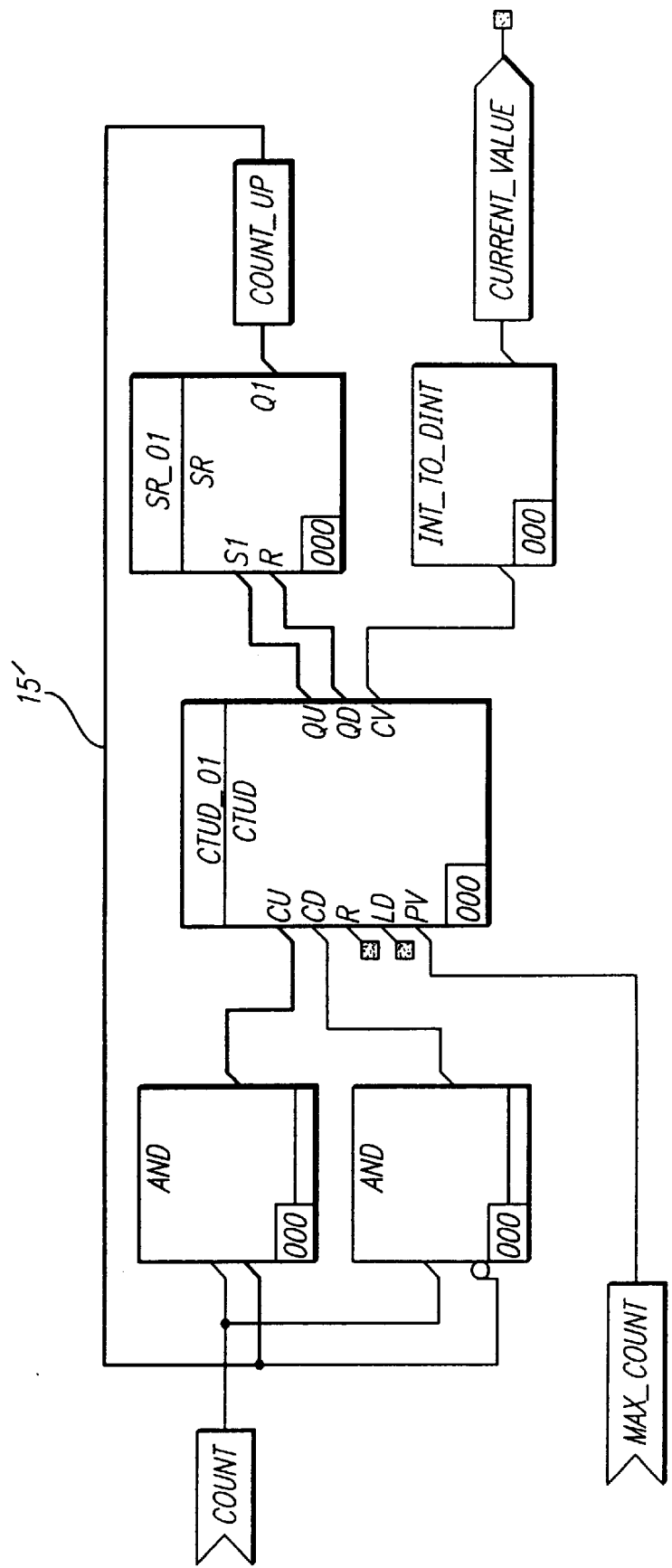
FIG. 3 shows a variant of FIG. 2 containing an illegal cycle.

During application development, the user might create a network with an illegal cycle. An example of an illegal cycle is three nodes {a, b, c} with normal (non-feedback) connections from a to b and back to a (via c). If there is at least one such illegal cycle in the network, then a must be evaluated before b, and b must be evaluated before a, which means that it is not possible to establish an evaluation order. FIG. 3 shows another example of an illegal cycle that would result if the feedback connection 16 were changed to a direct connect 16', in which case there would be two such cycles: 11a, 17, 24 and 11b, 17, 24. In the graphical user display of FIG. 3, all the nodes (11a, 17, 24) in the first such illegal cycle have been highlighted to facilitate possible corrective action by the user, although in an alternate embodiment (not shown), the nodes are merely included in an error list, and each node is sequentially highlighted on the diagram as the user scrolls down that error list. Note that in either case, all evaluation order sequence numbers 6 have are preferably reset to "000" on the displayed diagram to document the fact that no evaluation order has been assigned.

Preferably the entire function block diagram of FIG. 2 is constructed by means of a computerized graphical user Windows™ interface in which the various required graphical elements (blocks, connectors, wires, etc) are picked from pull-down lists or pop-up palettes and dragged into position on the computer screen, and default values for the various required alphanumeric labels are automatically generated and displayed for possible subsequent editing by the user. Furthermore, templates for many commonly used generic functions and function blocks will be available for copying from a shared library.

So that the elements of a particular diagram will always be evaluated with the same evaluation order (or stated in more functional terms, in order that the evaluation order is a function only of what is visible in the diagram, and is independent of how or in what sequence the diagram was constructed), it is desirable that the process of generating an evaluation order always follow a predetermined sequence and always generate a predetermined result. To that end, it will be noted that in accordance with standard IEC 1131-3, function and function blocks are always drawn with input terminals on the left side and outputs on the right side. Also, as previously noted, the connections between elements are directional, with output terminals from a particular element being connected to (if the connection is a normal wire 7) or from (if the connection is a feedback wire 16) input terminals of other elements (or to external outputs). Thus, there is some inherent order already present in an IEC 1131-3 function block diagram as a result of the way the input and output terminals of the functions and function blocks must be drawn and connected to other terminals. In accordance with the present invention (and in conformity with, but not required by, standard IEC 1131-3) at least those functions and function blocks having no output terminal connected to an input terminal of another function or function block of the same network (the so-called "maximal" nodes in the jargon of graph theory) are also given a predetermined order (for example, by connecting at least one terminal from any such function or function block to an ordered set of input terminals of an imaginary external block); once such an order has been established and assuming that certain other relatively trivial constraints are met, an evaluation order for the entire diagram can be uniquely determined. Two examples of such a predetermined ordering of maximal nodes are (1) alphabetical by name of associated variable (assuming that all output terminals and/or their associated output variables in the network have a unique name), or (2) spatial by location of the terminal (or its associated block) on the diagram.

Once all the output terminals have been so ordered, and again assuming that certain other relatively trivial topological constraints have been satisfied, an evaluation order may be uniquely determined by assigning a priority number p to each block by visiting the blocks in a manner similar to post-order (i.e., depth first) traversal of the nodes of a tree:

1. Create a pseudo block $B_0$ with input terminals connected to the network outputs in the same order—i.e., connect the first (top) network output to the first (top) input of pseudo block $B_0$ and connect the last (bottom) external output to the last (bottom) input of pseudo block $B_0$.
2. Initialize the priority p=0.
3. Initialize the state of each block in the network to "not visited".
4. Start recursive visits to each of the blocks by visiting the pseudo block $B_0$ with priority $p=V(B_0, p)$. The recursive function $V(B_r, p)$ visits block $B_r$ with the current priority p, and returns either the current value of p (if block $B_r$ has already been visited) or the updated priority assigned to that block $B_r$ during the current visit:

If block $B_r$ has already been visited, then return the current priority p else:

Visit input $I_{r1}$ of block $B_r$. If the output of a block $B_{r1}$ is connected to $I_1$ and block $B_{r1}$ has not yet been visited, then recursively visit block $B_{r1}$ and set $p=V(B_{r1}, p)$.

Visit input $I_{r2}$ of block $B_r$. If the output of a block $B_{r2}$ is connected to $I_2$ and block $B_{r2}$ has not yet been visited, then recursively visit block $B_{r2}$ and set $p=V(B_{r2}, p)$.

Visit the last input $I_{rj}$ of block $B_r$. If the output of a block $B_{rj}$ is connected to $I_j$ and block $B_{rj}$ has not yet been visited, then recursively visit block $B_{rj}$ and set $p=V(B_{rj}, p)$ Increment p.

Assign priority p to block $B_r$.

5. The process is terminated when all the output terminals connected to block $B_0$ have been visited, or the current value of the priority p is equal to N+1 (where N is the number of functions and function blocks not including pseudo block $B_0$).

Although the foregoing exemplary procedure starts at the output side of the network (in topological terminology, at a "maximal" node) and searches for a block that can be evaluated before all other blocks (in topological terminology, a "minimal" node), those skilled in the computer science art will realize that an equivalent process could be implemented that started from a "minimal" node at the input side of the network and searched for an "maximal" node that could be evaluated after all other blocks, in which case the evaluation order will be the reverse of the order in which the blocks were prioritized. Those skilled in the computer science art will also realize that it is not necessary (but may be computationally more advantageous, especially if the maximal nodes had already been identified in a previous process) to start each visit from a maximal node, but merely to ensure that the set of possible starting points does not exclude any such maximal node. Moreover, although the described post-order (i.e., depth first) traversal process in which the starting nodes have been given a predetermined order is considered preferable for most applications, many of the principles of the present invention are equally applicable to a more conventional topological sort process (such as described in the above-cited Stanat reference) in which no order is assumed to exist among co-existing maximal nodes.

Figure 4:
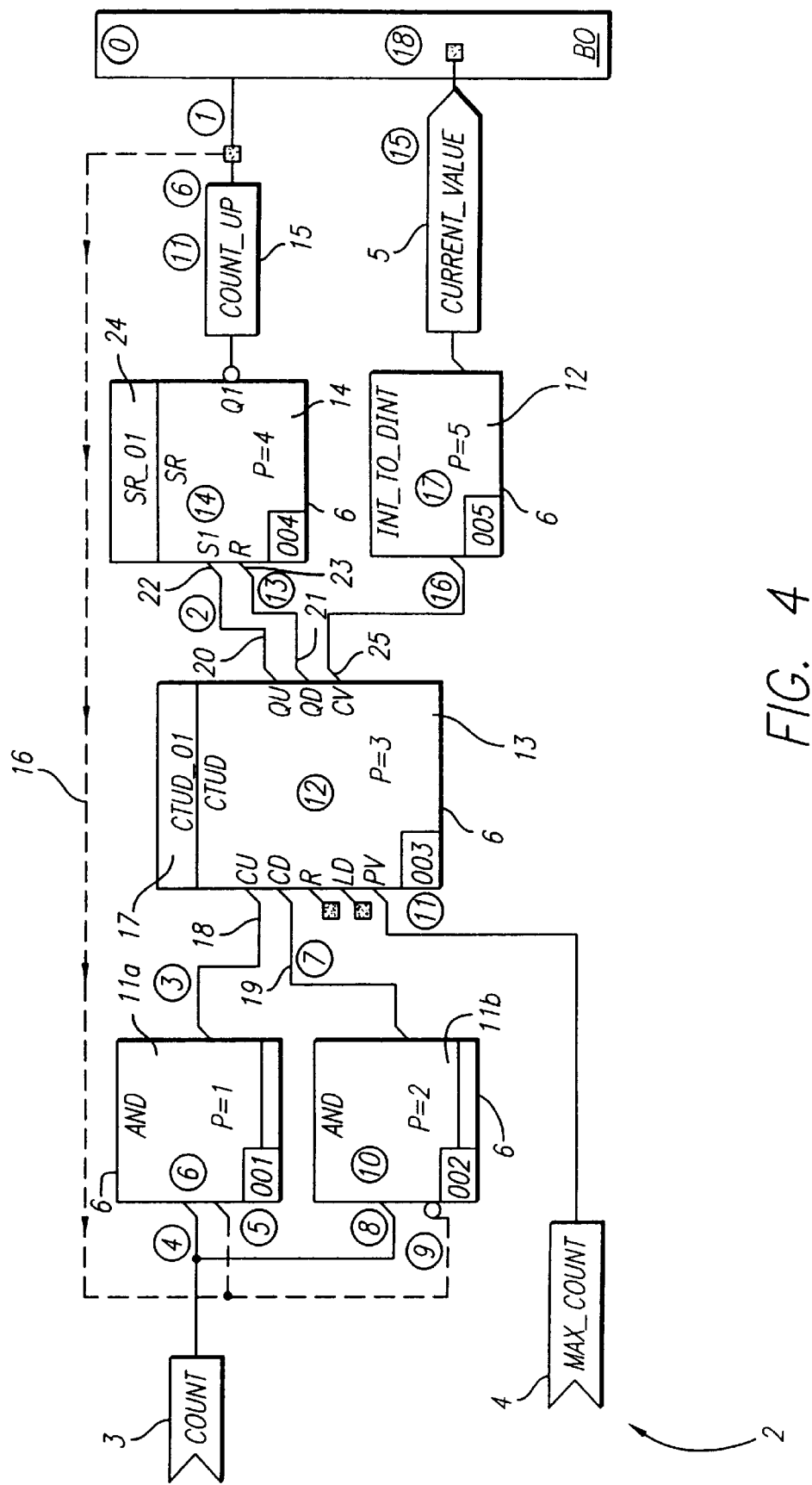
FIG. 4 shows various steps in a topological sorting procedure which will assign an evaluation order for evaluating the various elements of FIG. 3 after the illegal cycle has been corrected.

FIG. 4 illustrates an example of the above post-order traversal process, as applied to the function block diagram 2 of FIG. 2, (or to FIG. 3 after the two illegal cycles have been corrected).

Step 0: The two output terminals associated with the variables COUNT_UP 16 and CURRENT_VALUE 5 are connected to imaginary block $B_0$, and p is set to 0.

Step 1: The first input terminal (COUNT_UP 16) of block $B_0$ is visited, which leads to SR_01 block 24.

Step 2: The first (S1) input terminal 22 of block 24 is visited, which leads to CTUD_01 block 17.

Step 3: The first (CU) input terminal 18 of block 17 is visited, which leads to first AND block 11a.

Step 4: The first input terminal of AND block 11a is visited. It does not lead to any block possibly requiring prior evaluation, but only to external variable COUNT.

Step 5: The second input terminal of AND block 11a is visited. It is not a connection from a block possibly requiring prior evaluation, but rather a feedback wire 16 from block 24 that must be evaluated after block 11a.

Step 6: p is incremented and the new value (p=1) is assigned to block 11a.

Step 7: The second (CD) input terminal 19 of block 17 is visited, which leads to second AND block 11b.

Steps 8, 9, 10: Since block 11b also has no inputs with regular (non-feedback) wired connections from other blocks, p is incremented and the new value (p=2) is assigned to block 11b.

Step 11: The last (PV) input 27 of block 17 is visited, which does not lead to any other block.

Step 12: Since there are no more blocks to be visited from block 17, p is incremented and the new value (p=3) is assigned to block 17.

Step 13: The last (R) input 23 of block 24 is visited, which leads only to a block (CTUD_01 block 17) that has already been visited and that has already been assigned priority p=3.

Step 14: Since there are no more blocks to be visited from block 24, p is incremented and the new value (p=4) is assigned to block 24.

Step 15: The second input (CURRENT_VALUE 5) of block $B_0$ is visited, which leads to INT_TO_DINT function 12.

Step 16: The only input to INT_TO_DINT function 12 is visited, which leads only to a block (CTUD_01 block 17) that has already been visited and that has already been assigned priority p=3.

Step 17: Since there are no more blocks to be visited from block 12, p is incremented and the new value (p=5) is assigned to block 12.

Step 18: All N=5 block have been visited and a unique priority p has been assigned to each block.

Note that if there are no feedback connections, no illegal cycles, and the network is connected (the above-mentioned geometrical constraints), then the priority value p assigned to each block corresponds to the required evaluation order 6, where p=1 indicates the first block to be evaluated and p=N indicates the last block to be evaluated (not including pseudo block $B_0$). Note also the foregoing algorithm must be modified if "Wired-Or" is allowed, since it does not include a defined (non-arbitrary) way to choose one of the multiple outputs connected to a given input.

Prior to assigning the evaluation order, any illegal cycles can be isolated by recursively deleting all "minimal" elements (that do not have any input terminals connected by regular wires from any remaining function or function block) and all "maximal" elements (that do not have any output terminals connected to other elements) until there are no more maximal elements nor minimal elements. If the error set consists of only a few elements each such element (function or function block) can be visually identified on the function block diagram with a distinctive color or shading; alternatively, an error list can be generated and displayed to the user which lists all the affected elements, and each element in question can be graphically identified on the function block diagram as the user scrolls down the error list.

If the number of elements in the error set is large and contains more than one illegal cycle, one simple cycle can be identified for display to the user, as follows. First, mark every element in the error set as "not visited". By definition, each element in that error set is neither minimal nor maximal and will have an output connected directly to an input of another element of that same error set. Thus it will always be possible to start at an arbitrary first element x1 of the error set and to follow successive connections between elements to generate a simple path x1, x2, . . . , xi. Each element xi added to the simple path is marked "visited". When the last element xn added to that simple path leads to an element xk that has already been "visited", then elements xn and xk are both part of a single illegal cycle that starts at xk and ends at xn.

Disconnected networks may also be identified prior to the recursive visiting process, as follows: Assign a partition number n to an arbitrarily selected element. The same partition number may then be recursively assigned to all elements directly connected to previously partitioned elements, but not having an assigned partition number. When there are no more directly connected elements without assigned partition numbers, any remaining elements are not connected to the network defined by the first partition. Alternatively, by collapsing any identified illegal cycles into a single element and repeating the illegal cycle process to identify and collapse any other cycles in the same network, that entire network will eventually be reduced to a single element and any other disconnected networks will be readily apparent.

What is claimed is:

1. A computerized method for facilitating the development of a computer program documented in the form of a function block diagram in conformance with IEC standard 1131-3, said method comprising the steps of:

providing a user with a graphical user interface for
defining at least two executable function blocks, each said function block including one or more input terminals and one or more output terminals, and
connecting, either directly or indirectly via other program elements, at least one said block output terminal of one said block to a respective said block input terminal of another said block;

using the graphical user interface to define a function block diagram comprising at least two connected function blocks;

automatically detecting in said diagram thus defined, any cyclic connections from an output terminal of given instance of a particular said block to an input terminal of the same instance of said particular block;

if any said cyclic connection is detected, using said graphical interface to automatically highlight at least one said cyclic connection to said user; and if no such cyclic connection is detected, automatically determining an evaluation order for evaluating all said function blocks such that if a first block has an output terminal connected to an input terminal of a second block, said first block is evaluated before said second blocks wherein both said detecting and determining steps utilize a recursive topological sort procedure in each iteration of which a respective evaluation ordinal is automatically assigned to a block which has not already been assigned any said evaluation ordinal and which does not lead to another block which had not previously been assigned any said evaluation ordinal.

2. The computerized method of claim 1, wherein all said input terminals for a given said block appear on the left of said given block, and all said output terminals for a given said block appear on the right of said given block.

3. The computerized method of claim 2, wherein said evaluation order depends at least in part on an order in which each of said input and output terminals appears in a respective said block.

4. The computerized method of claim 1, wherein said evaluation order is automatically displayed on said diagram.

5. The computerized method of claim 1, wherein said evaluation order is unique and depends at least in part on the locations of said blocks in said diagram.

6. The computerized method of claim 1, wherein said diagram further comprises at least one connection of a persistent variable from an output terminal of block that was evaluated in a previous evaluation cycle to an input terminal of a block to be evaluated in a subsequent evaluation cycle.

7. The computerized method of claim 1, wherein said graphical user interface is adapted to edit said cyclic connection to include a "feedback" connection from an output terminal of a block included in said cyclic connection that was evaluated during a first evaluation cycle to an input terminal of a subsequent instance of the same or another block included in said cyclic connection to be evaluated during a subsequent evaluation cycle.

8. The computerized method of claim 1, further comprising the step of automatically checking the network thus defined for the presence of a disconnected network error in the form of at least one disconnected subnetwork.

9. The computerized method of claim 1, further comprising the step of automatically checking the network thus defined for the presence of a wired-OR error in the form of a direct connection to one of said input terminals from more than one of said output terminals.

* * * * *